United States Patent
Yuan et al.

(10) Patent No.: US 9,190,923 B2
(45) Date of Patent: Nov. 17, 2015

(54) SYSTEM AND METHOD FOR CONVERTER SWITCHING FREQUENCY CONTROL

(75) Inventors: Xiaoming Yuan, Wuhan (CN); Haiqing Weng, Shanghai (CN); Zhuohui Tan, Shanghai (CN); Yunfeng Liu, Shanghai (CN); Wenqiang Yang, Shanghai (CN); Pengcheng Zhu, Shanghai (CN)

(73) Assignee: General Electric Company, Schenectady, NY (US)

( * ) Notice: Subject to any disclaimer, the term of this patent is extended or adjusted under 35 U.S.C. 154(b) by 443 days.

(21) Appl. No.: 13/483,776

(22) Filed: May 30, 2012

(65) Prior Publication Data

US 2013/0134710 A1 May 30, 2013

(30) Foreign Application Priority Data

May 30, 2011 (CN) .......................... 2011 1 0143259

(51) Int. Cl.
| | |
|---|---|
| *F03D 7/00* | (2006.01) |
| *H02M 5/458* | (2006.01) |
| *F03D 9/00* | (2006.01) |
| *H02M 1/00* | (2007.01) |
| *H02P 9/02* | (2006.01) |

(52) U.S. Cl.
CPC .............. *H02M 5/458* (2013.01); *F03D 9/002* (2013.01); *H02M 1/00* (2013.01); *H02P 9/02* (2013.01)

(58) Field of Classification Search
CPC ..................................................... F03D 9/002
USPC .................................................... 290/44, 55
See application file for complete search history.

(56) References Cited

U.S. PATENT DOCUMENTS

| | | | |
|---|---|---|---|
| 6,256,212 B1 | 7/2001 | Wobben | |
| 7,095,128 B2 * | 8/2006 | Canini et al. | 290/44 |
| 7,239,113 B2 | 7/2007 | Johnson | |
| 7,605,487 B2 * | 10/2009 | Barton et al. | 290/44 |
| 7,622,815 B2 * | 11/2009 | Rivas et al. | 290/44 |
| 7,688,041 B2 | 3/2010 | Ng | |
| 7,787,266 B2 | 8/2010 | Janssen et al. | |
| 8,013,461 B2 * | 9/2011 | Delmerico et al. | 290/44 |
| 8,631,275 B2 * | 1/2014 | Opina et al. | 714/13 |
| 2007/0132248 A1 * | 6/2007 | Weng et al. | 290/44 |

(Continued)

FOREIGN PATENT DOCUMENTS

| | | |
|---|---|---|
| CN | 1860655 A | 11/2006 |
| CN | 101299573 A | 11/2008 |
| CN | 102013698 A | 4/2011 |

(Continued)

OTHER PUBLICATIONS

CN office action and search report issued in connection with CN Application No. 201110143259.8 dated Mar. 17, 2014.

*Primary Examiner* — Tho D Ta
(74) *Attorney, Agent, or Firm* — Global Patent Operation; Douglas D. Zhang

(57) ABSTRACT

A system for power conversion includes a power converter having switching elements, a detector, and a controller is provided. The detector detects a parameter and provides electrical signals indicative of the parameter. The controller receives the electrical signals transmitted from the detector, and sends commands to instruct the power converter to perform power conversion by operating the switching elements in accordance with switching signals at a different frequency in response to a detection of the system condition. A method for operating the system is also provided.

11 Claims, 11 Drawing Sheets

(56) References Cited

U.S. PATENT DOCUMENTS

2010/0156192 A1 6/2010 Wang et al.
2011/0175354 A1* 7/2011 Bo et al. .................... 290/44

FOREIGN PATENT DOCUMENTS

| EP | 1531542 | A2 | | 5/2005 |
| EP | 2221936 | A2 | * | 8/2010 |

* cited by examiner

1

SYSTEM AND METHOD FOR CONVERTER SWITCHING FREQUENCY CONTROL

BACKGROUND OF THE INVENTION

1. Field of the Invention

Embodiments of the invention relate generally to systems and methods of using converters for power conversion, and, more particularly, relate to switching frequency control of the converters.

2. Description of the Related Art

Power converters are used for converting power from one form to another in a variety of applications. For example, power converters may be used in renewable energy power generation systems, such as wind and solar power generation systems, for converting electrical power that can be transmitted over an electrical grid. In one specific type of wind turbine embodiment, an AC/DC converter known as rectifier converts AC power to DC power, and a DC/AC converter known as inverter converts DC power to AC power. In another example, converters may be used in switch-mode power supplies of consumer electronic devices such as personal computers and liquid crystal display televisions (LCD TVs). Converters used in the consumer electronic devices typically convert alternating current (AC) power drawn from a main power supply to direct current (DC) power for normal operations of the consumer electronic devices.

The converter typically includes one or more switching elements used for performing power conversion in response to switching signals provided from a controller. The frequency of the switching signals provided to the converter is typically maintained at a fixed value. When selecting the frequency to be used by a given converter, higher frequency switching signals lead to increased power losses whereas lower frequency switching signals tend to generate undesired harmonic components.

Therefore, it is desirable to provide systems and methods for control the frequency of converters to address the above-mentioned problems.

BRIEF DESCRIPTION OF THE INVENTION

In accordance with one embodiment disclosed herein, a system for power conversion is provided. The system comprises a power converter, a detector, and a controller. The power converter comprises switching elements. The detector is configured to detect a parameter, and to provide electrical signals indicative of the parameter. The controller is coupled to the power converter and the detector. The controller is configured to receive the electrical signals transmitted from the detector. The controller is further configured to send commands to instruct the power converter to perform power conversion by operating the switching elements in accordance with switching signals at a different frequency in response to a detection of the system condition.

In accordance with another embodiment disclosed herein, a wind farm system for generating electrical power is provided. The wind farm system comprises a plurality of wind turbines, a plurality of wind controllers, and a farm controller. The plurality of wind turbines is electrically coupled in a manner to a point of common connection (POCC). Each wind turbine comprises a power converter having switching elements operated to convert and supply electrical power to the POCC. Each wind turbine controller is electrically coupled to a corresponding power converter of the plurality of wind turbines. Each wind turbine controller is configured to provide switching signals at a predetermined frequency to a corresponding power converter. The farm controller is electrically coupled to the plurality of wind turbine controllers. The farm controller is configured to determine a number of the wind turbines in operation, and to instruct at least a subset of the wind turbine controllers of the plurality of wind turbines in operation to supply switching signals with varied frequency to the corresponding power converters based on the determined number of the wind turbines in operation.

In accordance with another embodiment disclosed herein, a method for operating a system to perform power conversion is provided. The method comprises converting, by operating switching elements in accordance with switching signals electric power generated from a generator to electric power for delivery to an electrical grid; detecting a condition in association with the system, and varying the frequency of the switching signals in response to the detected system conditions.

In accordance with yet another embodiment disclosed herein, a method for operating a windfarm to generate electric power is provided. The method comprises: determining, by a farm controller, a number of wind turbines in operation of the windfarm; and reducing or increasing, by the farm controller, frequency of switching signals supplied to at least a subset of the wind turbines in operation based on the determined number of wind turbines in operation.

In accordance with yet another embodiment disclosed herein, a power conversion system is provided. The power conversion system comprises a generator-side converter, a grid-side converter, a detector, and a controller. The generator-side converter is configured for converting alternating current (AC) electric power or direct current (DC) electric power generated from a generator to DC electric power. The grid-side converter is configured for converting the DC electric power to AC electric power. The detector is configured to detect a parameter and to provide electrical signals indicative of the parameter. The controller is coupled to the detector, the generator-side converter, and the grid-side converter. The controller is configured to receive the electrical signals transmitted from the detector and to determine the presence or absence of a system condition, the controller further configured to send commands to instruct the generator-side converter or the grid-side converter to perform power conversion in accordance with switching signals at a different frequency in response to a detection of the system condition.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

Embodiments disclosed herein relate to systems and methods for converter switching frequency control. These embodiments may be implemented either in a power conversion system having a single converter or in a power conversion system having multiple converters. For single converter applications, technical benefits of power loss reduction and lifetime control can be achieved by implementing switching frequency control of the converter. For multiple converter applications, an additional benefit is the potential reduction of harmonics when the converter switching frequency control is used in combination with other control strategies such as PWM interleaving.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

Figure 1:
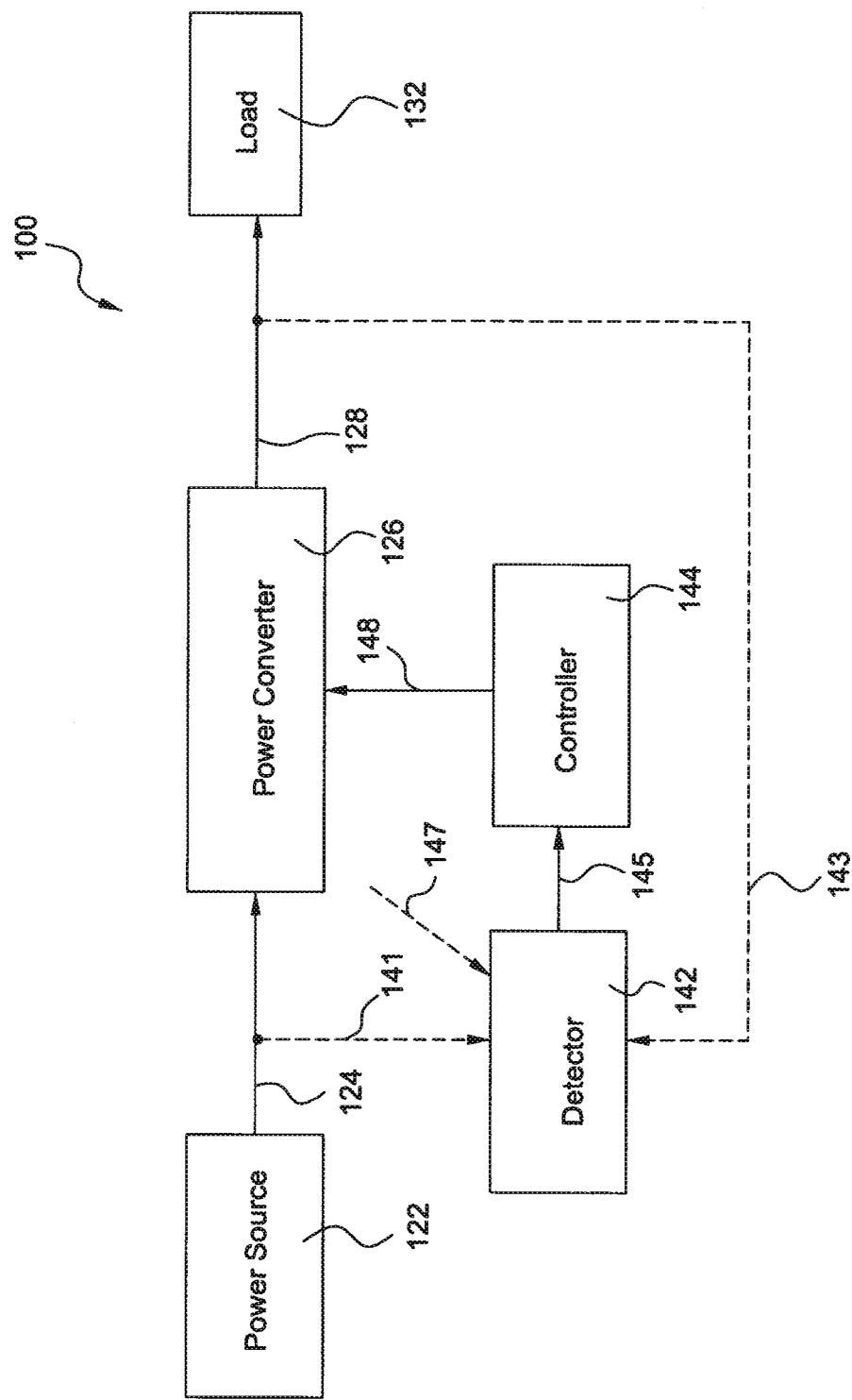
FIG. 1 is a block diagram of a system in accordance with an exemplary embodiment.

FIG. 1 illustrates a block diagram of a power conversion system 100 configured for performing power conversion in accordance with an exemplary embodiment. The power conversion system 100 may comprise a power consuming system or a power generation system. As used herein, "power consuming system" refers to a system capable of receiving electrical power transmitted from an electrical grid and converting the received electrical power for consumption by one or more electrical or electronic components of the power consuming system. As used herein, "power generation system" refers to a system capable of converting power extracted from a power source to a suitable form to be transmitted by an electrical grid. In one implementation, the power conversion system 100 shown in FIG. 1 may be embodied as a consumer electronic device such as a desktop computer, a laptop computer, a tablet computer, a cell phone, a personal digital assistant (PDA), a digital camera, or a liquid crystal display television (LCD TV), all of which may need to be supplied with electrical power converted by one or more converters. It should be noted that the description of FIG. 1 provided herein should not be limited to consumer electronic devices, as other electrical or electronic devices such as transportation electronics, telecommunications equipment, medical equipment, and industrial electronics may be covered by the present disclosure.

The illustrated embodiment of FIG. 1 illustrates a power source 122, a power converter 126, a load 132, a detector 142, and a controller 144.

When the power conversion system 100 is implemented in a power consuming system embodiment, the power source 122 may comprise a built-in power supply or an external power supply used for supplying electrical power to maintain normal operations of the power consuming system 100. The power converter 126 is electrically coupled to the power source 122 for receiving electrical power 124 provided from the power source 122. The electrical power 124 provided by the power source 122 may comprise alternating current (AC) power or direct current (DC) power. In case of the electrical power 124 comprising DC power, the power converter 126 may use a DC-DC converter for converting the electrical power 124 in DC form to DC power 128 which is used to drive or operate the load 132. As used herein, "load" refers to any suitable electronic elements that can process electrical signals or consume electrical energy in operation. In case of the electrical power 124 comprising AC power, the power converter 126 may use an AC-DC converter for converting the electrical power 124 in AC form to DC power 128 which is applied to the load 132.

In one implementation, the power converter 126 is configured to perform power conversion in accordance with switching signals 148 provided from the converter controller 144. As used herein, "switching signals" refers to electrical signals having magnitude alternate between high levels and low levels, where at the high level a switching element may be turned on, and where at the low level a switching element may be turned off. In normal operations, a frequency of the switching signals 148 is fixed at a first value for performing power conversion.

The detector 142 is in communication with the converter controller 144 and is configured for monitoring a system condition in association with the system 100. Although "a" converter, system condition, and controller are referenced in this paragraph for purposes of example, any of these aspects is meant to encompass one or more. As used herein, "system condition" is meant to encompass a condition of the power converter or elements that the power converter is coupled to and may be representative of, for example, a transient event, a short term event, or a long term event. For example, a transient event may be caused by a momentary over voltage, over current, under voltage, an under current conditions, a short term event may result from the need for system harmonics control, and a long term event may result from the need for lifetime control. The detector 142 may comprise one or more sensors or transducers for sensing various parameters of the system 100. The detector 142 sends status signals 145 indicating the presence and absence of the system condition to the converter controller 144 after one or more system conditions is detected. When the status signals 145 transmitted from the detector 142 indicate that a system condition is present, the converter controller 144 adjusts the frequency of the switching signals 148 supplied to the power converter 126. When the status signals 145 transmitted from the detector 142 indicates that no system conditions are present or the system conditions end to warrant an adjusted switching frequency, the converter controller 142 maintains the switching frequency at a nominal frequency or, if a prior adjustment has been made, readjusts the frequency of the switching signals 148 back to the nominal frequency.

In one implementation, as indicated by dashed line 141 of FIG. 1, the detector 142 may be electrically coupled between the power source 122 and the power converter 126 for monitoring a system condition in association with the source side of the system 100. The detector 142 may be configured to detect a variety of electrical signals such as voltage signals, current signals, or phase information. When a notable source side condition is detected by the detector 142, corresponding status signals 145 are sent from the detector 142 to the converter controller 144, which in turn results in the converter controller 144 changing a frequency of the switching signals 148 applied to the power converter 126 based on the status signals 145. In one implementation, in response to a source side system condition, a frequency of the switching signals is adjusted to a second value smaller than the first value for performing power conversion. Because the frequency of the switching signals is reduced, less energy is consumed while operating the switching elements during that time period, resulting in less thermal stress on the power converter 126. The converter controller 144 recovers the frequency of the switching signals 148 to the first value when the one or more source side conditions are determined to be absent by the detector 142.

With continuing reference to FIG. 1, in another implementation, as indicated by dashed line 143, the detector 142 may be electrically coupled between the power converter 126 and the load 132 for monitoring system conditions associated with the load side of the system 100. When one or more load side conditions are detected by the detector 142, corresponding status signals 145 are sent from the detector 142 to the converter controller 144 to instruct the converter controller 144 to change a frequency of the switching signals 148 applied to the power converter 126. In one implementation, in response to a detected load side system condition, a frequency of the switching signals is adjusted to a second value smaller than the first value for performing power conversion.

With continuing reference to FIG. 1, in yet another implementation, the detector 142 may be placed in proximity to the power converter 126 and is in thermal connection (as indicated by dashed line 147) with the power converter 126. The detector 142 is configured to detect a temperature of the power converter 126 or a temperature of the air surrounding the power converter 126 and send status signals 145 indicating detected temperature to the converter controller 144. The converter controller 144 changes the frequency of the switching signals 148 applied to the power converter 126 according to the detected temperature. These three example implementations may be used individually or in combination with each other as well as other detection implementations.

Figure 2:
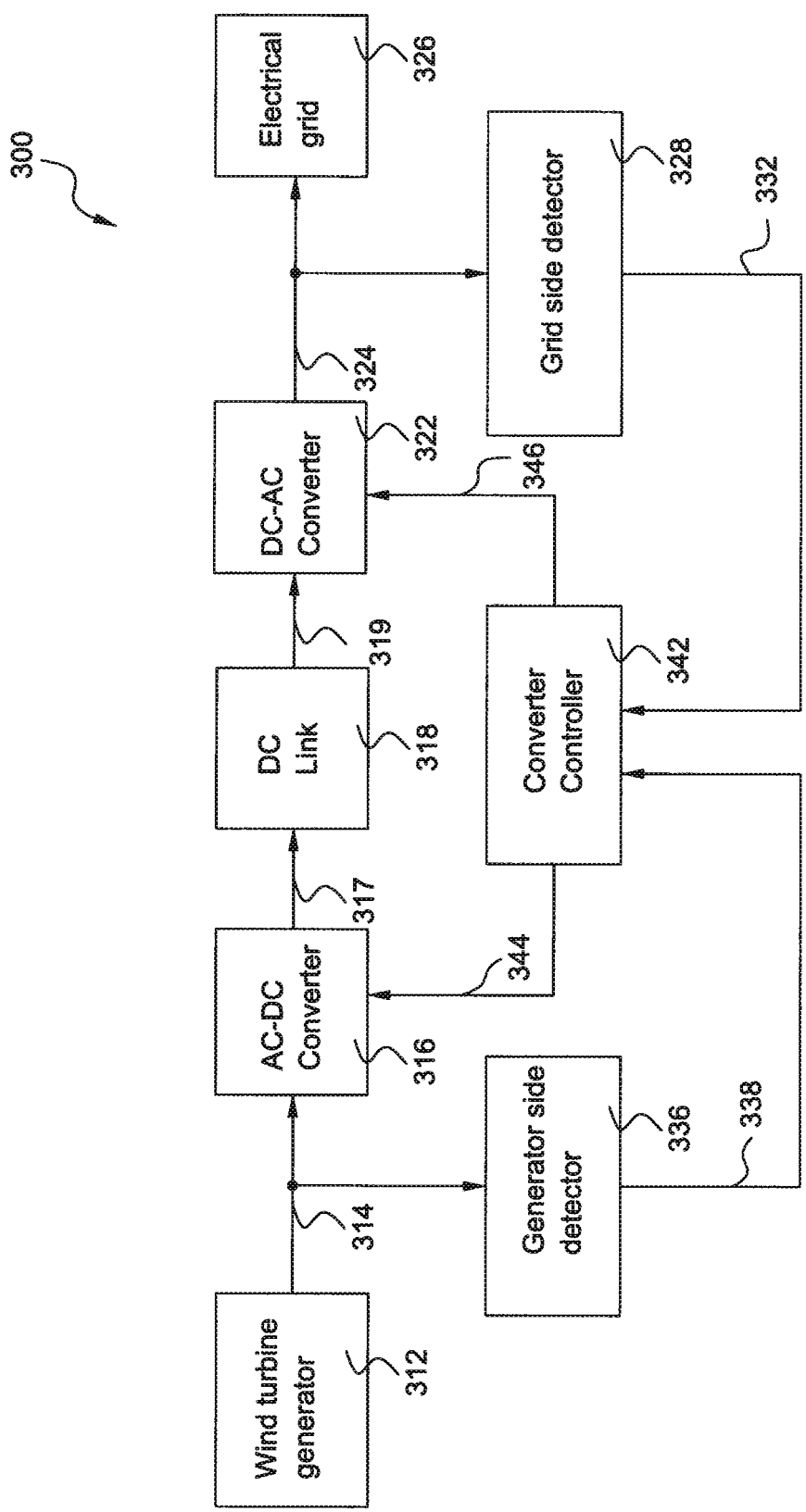
FIG. 2 is a block diagram of a wind turbine system in accordance with an exemplary embodiment.

In another embodiment, the power conversion system 100 may comprise a power generation system such as a wind turbine generator, a solar generator, or tidal turbine generator. One example of such a power generation system is shown in FIG. 2. FIG. 2 illustrates a block diagram of a wind turbine system 300 in accordance with an exemplary embodiment.

The wind turbine system 300 generally includes a wind turbine generator 312, an AC-DC converter 316, a DC link 318, a DC-AC converter 322, a converter controller 342, a generator-side detector 336, and a grid-side detector 328.

The wind turbine generator 312 is configured to transform mechanical wind power to mechanical rotational power and to convert the mechanical rotational power to generate three-phase alternating current (AC) electric power 314.

The AC-DC converter 316 acts as a rectifier and is configured to rectify the three-phase AC electric power 314 to DC electric power 317 controlled by the converter controller 342. The DC link 318 may include one or more capacitors coupled in series or in parallel and is configured to mitigate voltage variations across the DC link 318 with AC rectification. The DC-AC converter 322 acts as an inverter and is configured to convert the DC electric power 319 from the DC link 24 back to three-phase AC electric power 324 controlled by the converter controller 342. The three-phase AC electric power 324 is subsequently delivered to the electrical grid 326. While the present embodiment shows the wind turbine system 300 as being grid-connected, it should be understood that, in other embodiments, the wind turbine system 300 may be directly coupled to an AC load, such as a motor, a pump, battery, or any other type. Additionally, although a single converter controller 342 is shown for purposes of example, multiple converter controllers may alternatively be used.

Figure 3:
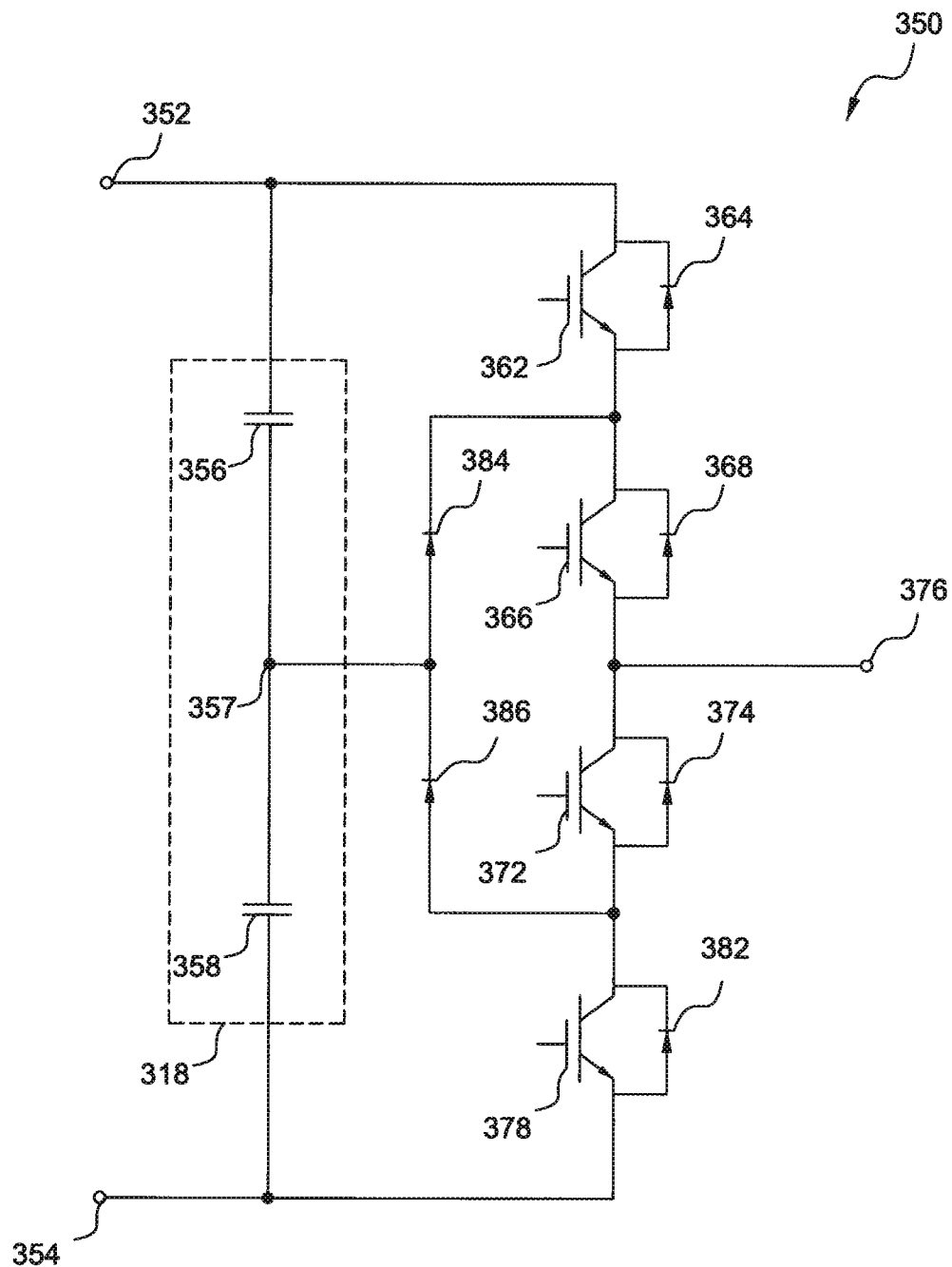
FIG. 3 illustrates one leg of a three-level converter employed in the wind turbine system shown in FIG. 2 in accordance with an exemplary embodiment.

The AC-DC converter 316 may comprise any suitable converter topology with several example topologies including diode-clamped (neutral-point-clamped) converters, flying capacitor converters, and cascaded converters. The DC-AC converter 322 may comprise any suitable converter topology with several example topologies including but not limited to diode-clamped converters, flying capacitor converters, and cascaded converters. FIG. 3, for example, illustrates one phase leg of a three-level DC-AC converter 350 having a neutral-point-clamped topology in association with the DC link 318. As shown in FIG. 3, the three-level converter 350 includes four switching elements 362, 366, 372, 378, and six diodes 384, 386, 364, 368, 374, 382. The four switching elements 362, 366, 372, and 378 may include any suitable type of semiconductor based switching devices, such as insulated gate bipolar transistors (IGBTs), gate communicated thyristors (GCTs), and metal oxide semiconductor field effect transistors (MOSFETs).

The phase leg of the three-level DC-AC converter 350 shown in FIG. 3 is configured to provide one phase of AC output using a pulse width modulation (PWM) strategy with three voltage levels. The three voltage levels may include a high level, an intermediate level, and a low level. For example, when the switching elements 362 and 366 are switched on and the switching elements 372 and 378 are switched off, the output terminal 376 is connected to the input terminal 352 to provide a high level voltage. When the switching elements 366 and 372 are switched on and the switching elements 362 and 378 are switched off, the output terminal 376 is connected to the neutral point 357 located between the capacitors 356 and 358, thus providing an intermediate voltage. When the switching elements 372 and 378 are switched on and the switching elements 362 and 366 are switched off, the output terminal 376 is connected to the input terminal 354 to provide a low level voltage. It will be appreciated by those skilled in the art that the three-level converter 350 can be increased to any level depending on the circuit topology.

Referring back to FIG. 2, in one implementation, the generator-side detector 336 is electrically coupled to a joint connection between the wind turbine generator 312 and the AC-DC converter 316. The generator-side detector 336 is provided to detect one or more conditions associated with the generator side of the wind turbine system 300. The generator side conditions may comprise, for example, a gust of wind or mechanical or electrical failure causing shut down of the wind turbine generator 312. The generator-side detector 336 provides detection results in the form of electrical signals 338 to the converter controller 342. The electrical signals 338 for determining the generator side condition may comprise generator speed signals or torque commands, for example.

As shown in FIG. 2, in one implementation, the grid-side detector 328 is electrically coupled to a joint connection between the DC-AC converter 322 and the electrical grid 326. The grid-side detector 328 is provided to detect one or more grid side conditions in relation to the grid side of the wind turbine system 300. In one implementation, as illustrated in FIG. 2, two detectors 336 and 328 are separately employed for detecting the generator side events and grid side events. In other implementations, a single detector may be used to detect both the generator side events and the grid side events. The grid side events may comprise fault on the electrical grid 326 including low voltage ride through (LVRT) conditions or zero voltage ride through (ZVRT) conditions, for example. The grid-side detector 328 provides detection results in the form electrical signals 332 to the converter controller 342. The electrical signals 332 may include voltage signals, current signals, and phase information, for example.

With continuing reference to FIG. 2, in one implementation, the converter controller 342 is configured to determine whether any generator side condition is present by receiving and analyzing the electrical signals 338 transmitted from the generator-side detector 336 and to determine whether any grid side condition is present by receiving and analyzing the electrical signals 332 transmitted from the grid-side detector 328. When a generator side condition changes, the converter controller 342 changes the frequency of the switching signals 344 applied to the AC-DC converter 316. In one implementation, when a generator side condition deviates from a nominal range, the frequency of the switching signals 344 is reduced such that less power loss is generated from the switching elements during operation of the switching elements in the AC-DC converter 316 during the period of the generator side condition. Because less power loss is generated, less heat generated by switching operations of the switching elements makes the AC-DC converter 316 has less thermal or cooling stress. When the condition that caused the change in frequency to be made is no longer present, the converter controller 342 resets the frequency of the switching signals 344.

Similarly, when the one or more grid side conditions are determined to be present on the electrical grid 326, the converter controller 342 changes the frequency of the switching signals 346 applied to the DC-AC converter 322. In one implementation, the frequency of the switching signals 346 is also reduced to have less power loss during operation of the switching elements in the DC-AC converter 322 during the period of the grid side condition. Under grid side conditions where more current is needed than normal, such as low voltage ride through or zero voltage ride through, harmonics from the lower switching frequency are not expected to be detrimental in light of the power loss savings. When the condition that caused the change in frequency to be made is no longer present, the converter controller 342 resets the frequency of the switching signals 346 applied to the DC-AC converter 322.

Figure 4:
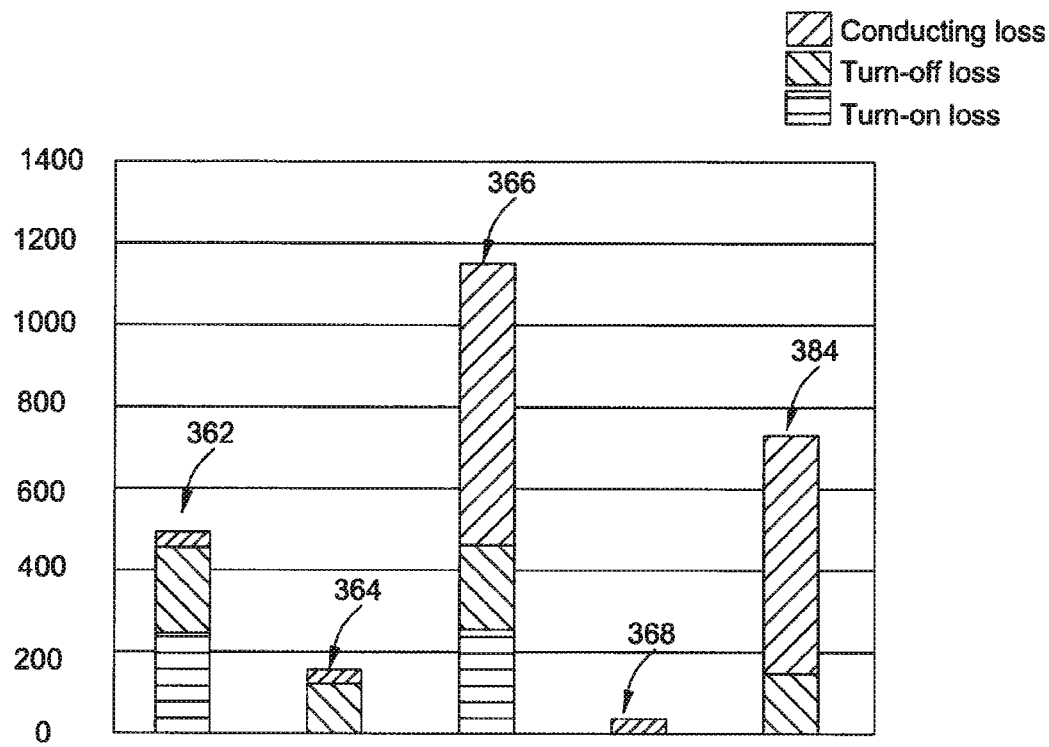
FIG. 4 is a diagram illustrating conduction loss and switching loss generated by operating a converter of a conventional wind turbine system.
Figure 5:
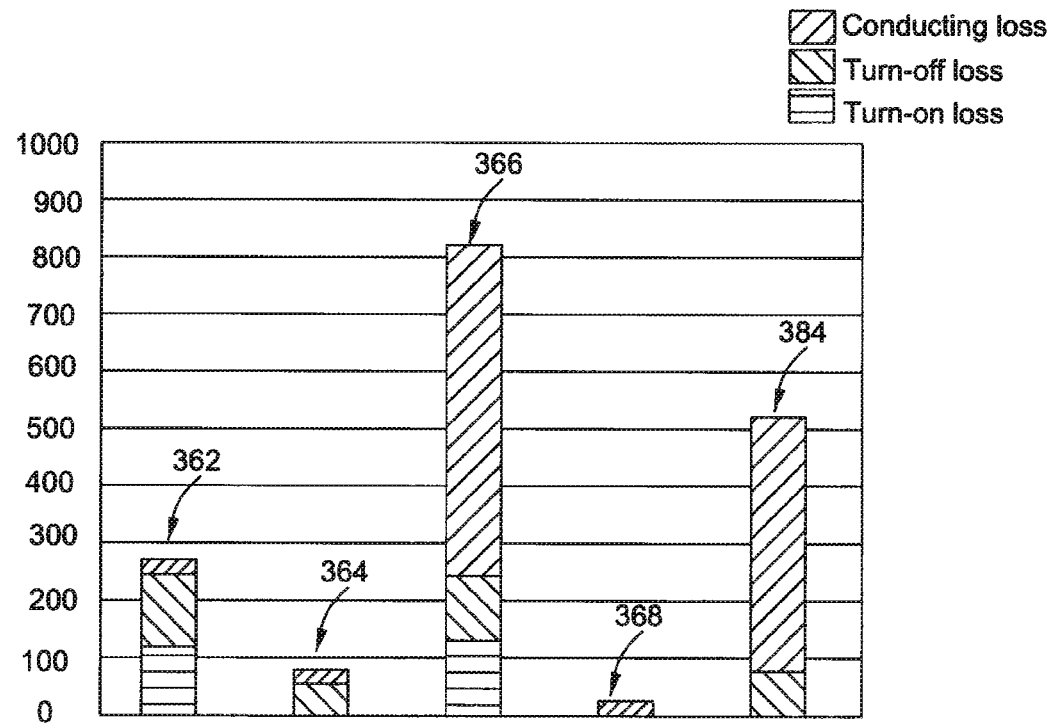
FIG. 5 is a diagram illustrating conduction loss and switching loss generated by operating the converter of the wind turbine system shown in FIG. 2 in accordance with an exemplary embodiment.

FIG. 4 illustrates power losses generated by operating the DC-AC converter 322 in accordance with switching signals provided from the converter controller 342 with nominal frequency, when the wind turbine system 300 is experiencing ZVRT conditions. FIG. 5 illustrates power losses generated by operating the DC-AC converter 322 in accordance with switching signals provided from the converter controller 342 with reduced frequency, also during ZVRT conditions. The power losses include conduction loss, turn-on loss, and turn-off loss, wherein turn-on loss and turn-off loss are generally referred to as switching loss. As used herein, "conduction loss" refers to power consumption while a particular device is on, "turn-on loss" refers to power consumption of a particular device transitioning from fully off state to fully on state, and "turn-off loss" refers to power consumption of a particular device transitioning from fully on state to fully off state.

In FIG. 4, the switching signals provided to the DC-AC converter 322 have a frequency of 3.4 KHz, and an estimated switching loss generated during the ZVRT events is 30.6 KW. In FIG. 5, the switching signals provided to the DC-AC converter 322 is reduced to 1.7 KHz, and an estimated switching loss generated during the ZVRT events is 23.0 KW. Because diodes 384 and 386 act similarly during switching operations, only the power loss of the diode 384 is shown in FIG. 4 and FIG. 5. It can be seen that the turn-off loss the diode 384 is reduced when the frequency of the switching signals is changed from 3.4 KHz to 1.7 KHz. Because the switching elements 362 and 366 act similarly with respect to the switching elements 372 and 378 during switching operations, only the power loss of the switching elements 362 and 366 are shown in FIG. 4 and FIG. 5. It can be seen that the turn-on loss and turn-off loss of the switching elements 362 and 366 are reduced when the frequency of the switching signals is changed from 3.4 KHz to 1.7 KHz. Likewise, because the diodes 364 and 368 act similarly with respect to the diodes 374 and 382 during switching operations, only the power loss of the diodes 364 and 368 are shown in FIG. 4 and FIG. 5. It can be seen that the turn-off loss the diode 364 is reduced when the frequency of the switching signals is changed from 3.4 KHz to 1.7 KHz. In other words, given the same thermal or cooling stress, with reduced switching frequency, the converter 322 can handle higher transient current or power.

It should be understood that similar results could be obtained by reducing the frequency of the switching signals provided to the AC-DC converter 316 when one or more generator-side events is detected.

Figure 6:
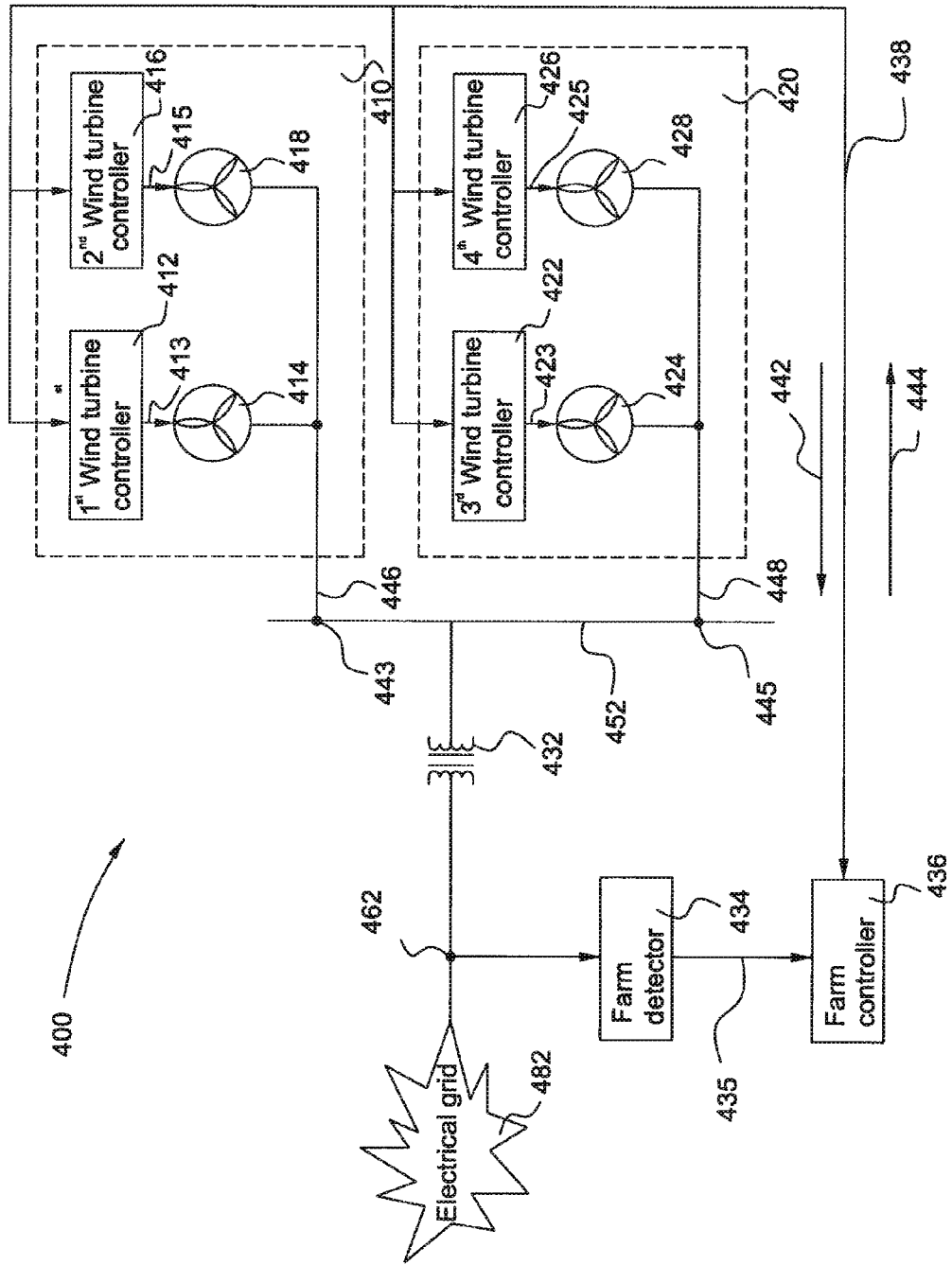
FIG. 6 is a block diagram of wind farm system in accordance with an exemplary embodiment.

Referring to FIG. 6, a block diagram of a wind farm system 400 is illustrated in accordance with one embodiment of the present disclosure. The wind farm system 400 is configured to provide electrical power generated from wind energy to the electrical grid 482. The wind farm system 400 embodies aspects of frequency control over one or more converters employed in a plurality of wind turbines of the wind farm system 400.

As show in FIG. 6, in one implementation, the wind farm system 400 comprises a first wind turbine group 410, a second wind turbine group 420, a transformer 432, a farm detector 434, and a farm controller 436. The first wind turbine group 410 and the second wind turbine group 420 are configured for providing electrical power generated from wind energy to a collector bus 452. The transformer 432 receives electrical power from the collector bus 452 and outputs electrical power with desired voltage amplitude or current amplitude to the electrical grid 482. The electrical parameters of the electrical power delivered to the electrical grid 482 are detected by the farm detector 434 at a point of common coupling (POCC) 462 located at the transformer 432 and the electrical grid 482, and the detected electrical parameters of the electrical power at the POCC 462 are provided to the farm controller 434 in form of electrical signals 435. The farm controller 436 is further in electrical communication with the first wind turbine group 410 and the second wind turbine group 420. The farm controller 436 is configured for receiving status signals from the first and second wind turbine groups 410, 420. For example, the farm controller 436 may receive electrical signals 442 indicating whether a wind turbine is in operation. The farm controller 436 is further configured for transmitting commands for controlling operation of the one or more wind turbines in the first wind turbine group 410 or the second wind turbine group 420.

Further referring to FIG. 6, in the illustrated embodiment, the first wind turbine group 410 includes a first wind turbine 414, a second wind turbine 418, a first wind turbine controller 412, and a second wind turbine controller 416. The first wind turbine 414 is electrically coupled to the collector bus 452 at a first point of feeder connection 443 via a first connection line 446. The first wind turbine 414 and the second wind turbine 418 are controlled by the first wind turbine controller 412 and the second wind turbine controller 416 respectively to provide AC electrical power to the first point of feeder connection 443. Although two wind turbines and corresponding wind turbine controllers are illustrated, it should be noted that more wind turbines and wind turbine controllers could be further added in the first wind turbine group 410. Additionally, a common control unit could be used for multiple wind turbines in alternative embodiments.

Further referring to FIG. 6, in the illustrated embodiment, the second wind turbine group 420 includes a third wind turbine 424, a fourth wind turbine 428, a third wind turbine controller 432, and a fourth wind turbine controller 425. The second wind turbine group 420 is also electrically coupled to the collector bus 452 at a second point of feeder connection 445 via a second connection line 448. The third wind turbine 424 and the fourth wind turbine 428 are controlled by the third wind turbine controller 422 and the fourth wind turbine controller 426 respectively to provide AC electrical power to the second feeder point 445.

In one implementation, the four wind turbines 414, 418, 424, 428 may each comprise one or more converters having one or more switching elements for performing power conversion in accordance with switching signals 413, 415, 423, 425 supplied from the four wind turbine controllers 412, 416, 422, 426 respectively. In one aspect, similarly as described above with respect to FIGS. 2-4, the four wind turbines 414, 418, 424, 428 can be configured with the capability of varying the frequency of the switching signals 413, 415, 423, 425 when one or more predetermined conditions or events are detected to be present in association with the four wind turbines 414, 418, 424, 428. The frequency of switching signals 413, 415, 423, 425 can be restored when the one or more predetermined conditions or events are detected to be absent in association with the four wind turbines 414, 418, 424, 428.

Figure 7:
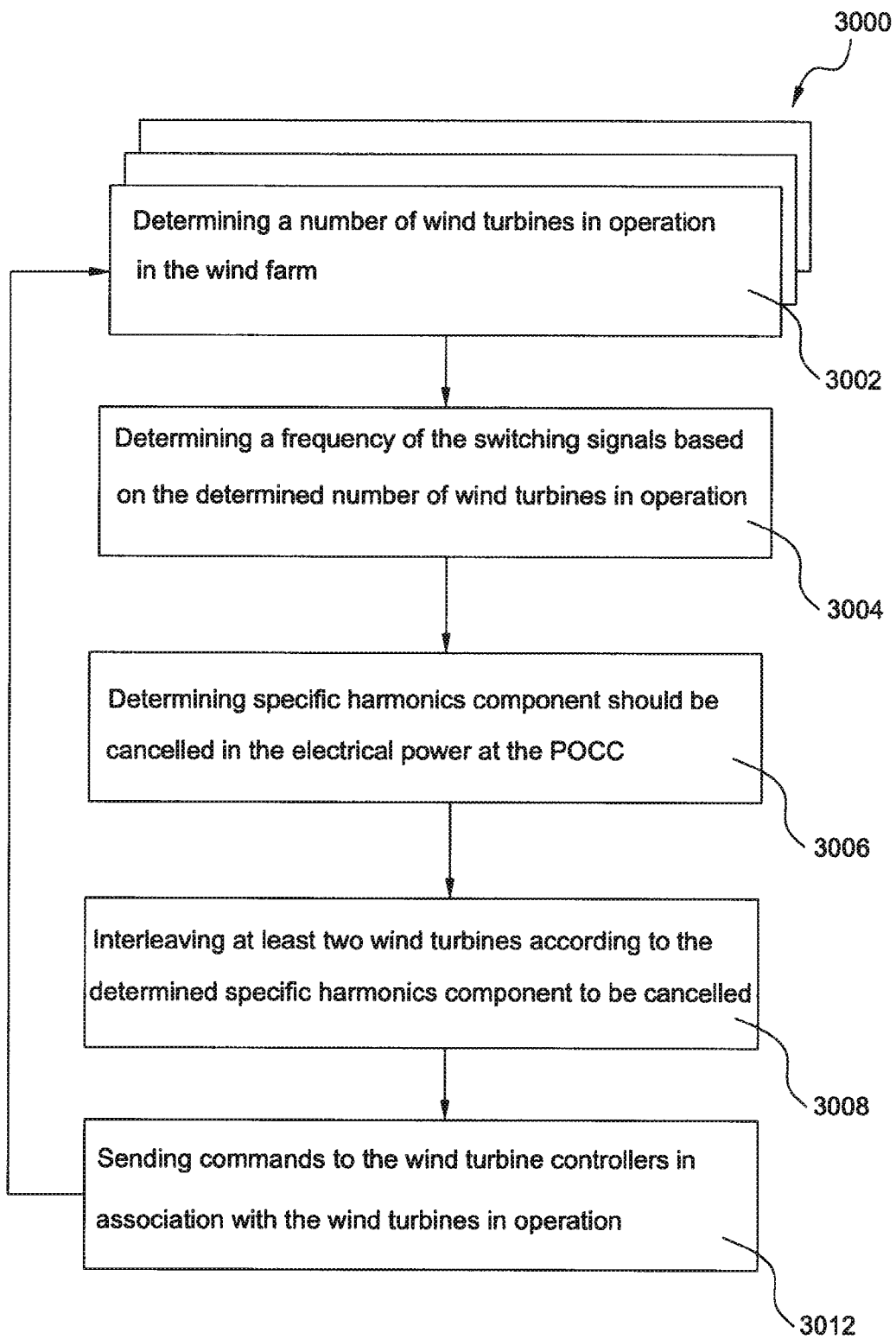
FIG. 7 is a flowchart of a method of reducing or increasing switching frequency of converters in one or more operational wind turbines in the wind farm system shown in FIG. 6 in accordance with an exemplary embodiment of the present disclosure.

In another aspect, the frequency of the switching signals 413, 415, 423, 425 can be varied when implementing a turbine interleaving method in the wind farm system 400. FIG. 7 is a flowchart illustrating a turbine interleaving method 3000 for performing frequency control over one or more converters of wind turbines in the wind farm system 400. The method 3000 may be programmed with software instructions stored in a computer-readable medium, which when executed by a processor, perform various steps of the method 3000. The computer-readable medium may include volatile and non-volatile, removable and non-removable media implemented in any method or technology. The computer-readable medium includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system.

In one implementation, the method 3000 may begin at block 3002. At block 3002, a number of wind turbines in operation in the wind farm system 400 is determined In one implementation, the farm controller 436 determines the number of the wind turbines in operation by receiving and analyzing the electrical signals 442 transmitted from the wind turbines in the first and second wind turbine groups 410, 420 via a communication system 438. A wind turbine is operational when the wind turbine generates electrical power (e.g., real power or reactive power) that is transmitted through the transformer 432 to the electrical grid 482. In one implementation, the communication system 438 comprises a supervisory control and data acquisition (SCADA) system. As used herein, "SCADA" refers to a computer-based system that allows local and remote control of basic wind turbine functions and collects data from the wind farm that can be used to analyze and report on the operational performance.

At block 3004, a frequency of the switching signals is determined based on the number of wind turbines in operation. In one implementation, the frequency of the switching signals is reduced to a value smaller than a nominal value. The nominal value is set to meet harmonic standard at the point of feeder connection 443, 445 or harmonic standard at the POCC 462. As a non-limiting example, the nominal value of the switching signals may be 3.0 KHz. More specifically, the frequency of the switching signals is reduced according to the following two conditions:

$$f = f_{nom}/N \qquad (1),$$

$$f \geq f_{min} \qquad (2),$$

where f is the reduced frequency value, $f_{nom}$ is the nominal frequency value, N is the number of the wind turbines determined to be in operation, and $f_{min}$ is a frequency value set to meet control bandwidth requirement of the wind turbines. From formula (1), it can be known that the more the wind turbines in the wind farm system 400 are determined to be in operation, the lower the frequency of the switching signals can be reduced. If the reduced frequency calculated according to formula (1) is smaller than the minimum value $f_{min}$, the reduced frequency value f is selected to be $f_{min}$. As described, in on implementation, each of the operational wind turbines is supplied with switching signals having the same frequency. In other implementation, each of the operational wind turbines may be supplied with the switching signals having different frequency, as long as the switching frequency is reduced to a value satisfying the following condition:

$$f_{max} \geq f \geq f_{min} \qquad (3),$$

where $f_{max}$ is a nominal frequency value set according to a harmonic standard, $f_{min}$ is a frequency value set to meet control bandwidth requirement of the wind turbines. It should be understood that, in some implementations, not all of the wind turbines determined to be in operation should work in accordance with switching signals having reduced frequency value. It is possible that a subset of the operational wind turbines will operate with reduced frequency switching signals, and the remaining one or more wind turbines will work with their original frequency switching signals. For example, in one implementation, when there are five wind turbines determined to be in operation at a specific time, it is possible that three wind turbines operate with reduced frequency switching signals, and the other two wind turbines operate with their original frequency switching signals.

At block 3006, specific harmonic components to be cancelled from the electrical power delivered at the POCC 462 are determined In one implementation, the farm detector 434 may comprise a harmonic detector for detecting harmonic components of the electrical power at the POCC 462. The farm controller 436 receives the detected information of the harmonic components from the harmonic detector 434. The specific harmonic components to be cancelled can be determined according to a harmonics standard defined to meet the requirement of the electrical grid 482. In another implementation, harmonics components to be cancelled can be determined at the first point of feeder connection 443 or the second point of feeder connection 445.

At block 3008, at least two wind turbines in the wind farm system 400 are interleaved according to the determined specific harmonic components to be cancelled. The at least two wind turbines that are interleaved may be in the same wind turbine group or in different wind turbine groups. For example, the first wind turbine 414 and the second wind turbine 418 in the first wind turbine group 410 may be interleaved. For another example, the first wind turbine 414 in the first wind turbine group 410 and the third wind turbine 424 in the second wind turbine group 420 may be interleaved. As used herein, "interleaved" refers to a system level harmonic suppression method that at least two wind turbines either in a same wind turbine group or in different wind turbine groups are controlled by individual wind turbine controllers or optionally by a farm controller to shift phases or angles of carrier signals, fundamental waveforms, or a combination of carrier signals and fundamental waveforms to cancel harmonic components of the electrical power provided to the electrical grid. In one example, "carrier signals" may comprise triangular waveforms and "fundamental waveforms" may comprise sine waveforms, both of which are particularly provided to generate switching signals for driving one or more switching elements in one or more power converters. In one implementation, a more detailed explanation of the "turbine interleaving method" can be found in commonly assigned Wang et al., US Patent Application Publication 2010/0156192, which is incorporated by reference herein.

At block 3012, reference commands are generated and transmitted to the wind turbine controllers associated with operational wind turbines. The reference commands may comprise switching frequency reference commands and interleaving information reference commands. In one implementation, the switching frequency reference commands are generated based on the reduced frequency of the switching signals, for example. The interleaving information reference commands may be generated based on phase or angle shifts of carrier signals, fundamental waveforms, or a combination thereof, for example. In one implementation, the farm controller 436 transmits the reference commands 444 to each wind turbine controller of the wind turbines that are determined to be in operation.

Figure 8:
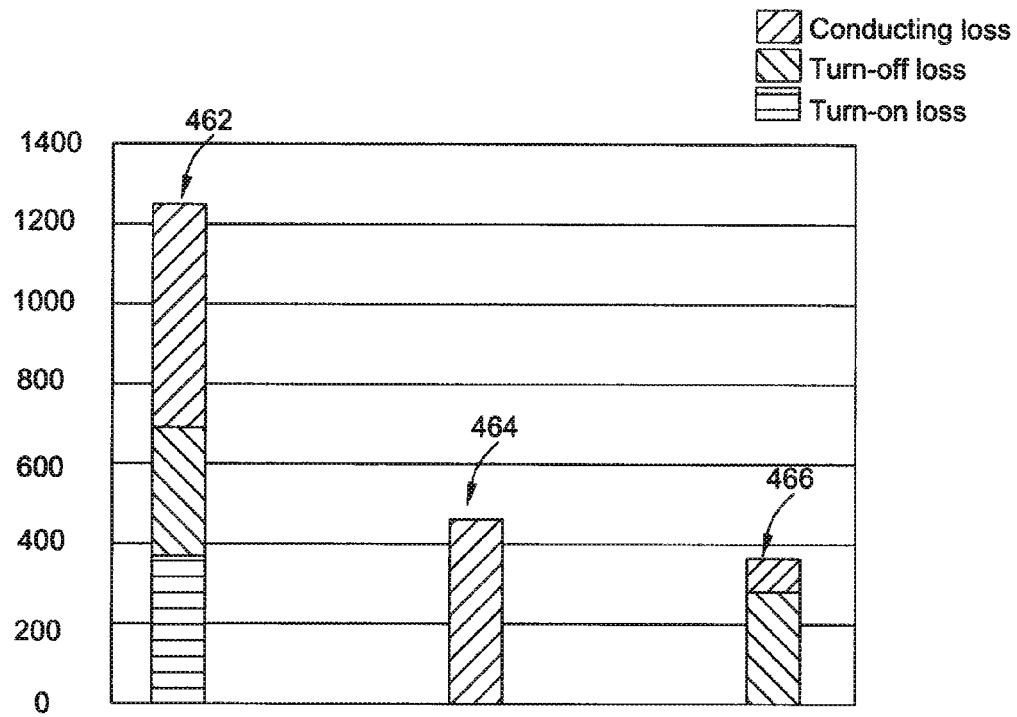
FIG. 8 is a diagram illustrating power loss by operating a converter of a conventional wind farm system.
Figure 9:
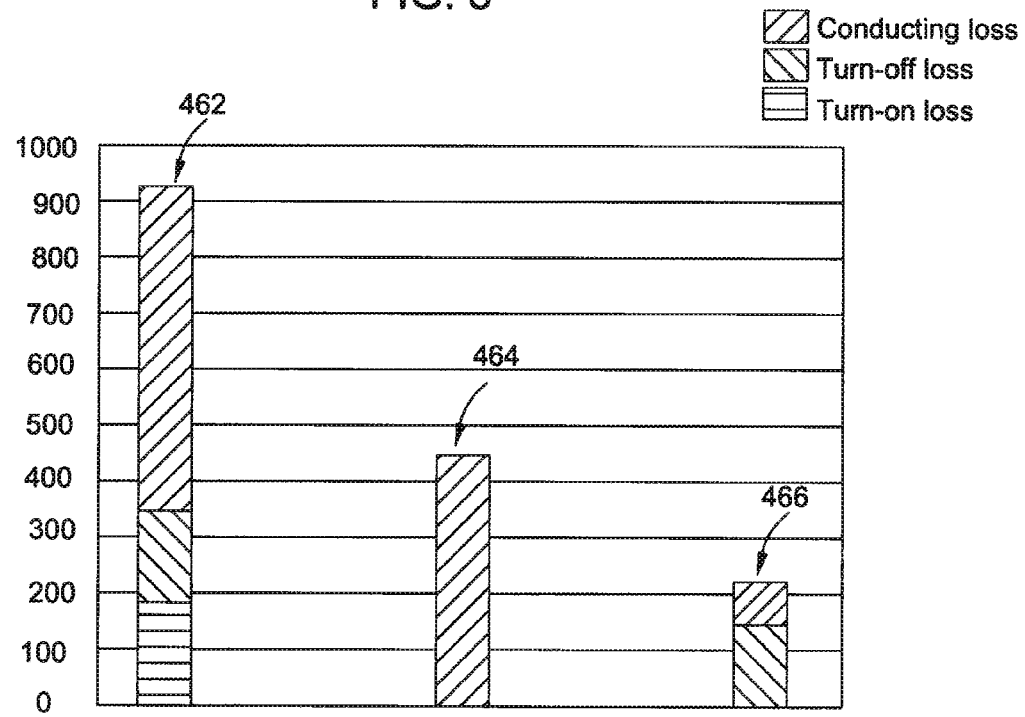
FIG. 9 is a diagram illustrating power loss by operating at least one converter of the wind farm system shown in FIG. 6 in accordance with an exemplary embodiment.

FIG. 8 illustrates power losses generated by operating one or more converters in the operational wind turbines in accordance with switching signals provided from the corresponding converter controllers. In particular, the switching signals are set with a normal frequency. FIG. 9 illustrates power losses generated by operating the converter of the operational wind turbines in accordance with switching signals provided from the corresponding converter controller with reduced frequency. Referring to FIGS. 8 and 9, stacked bars 462 and 464 represent power loss including conduction loss, turn-off loss, and turn-on loss generated by switching elements as those shown in FIG. 3, and stacked bar 466 represents power loss generated by diodes as those shown in FIG. 3. In FIG. 8, the switching signals provided to the converter have a frequency of 3.4 KHz, and an estimated power loss generated due to the grid side events is 22.6 KW. In FIG. 9, the frequency value of switching signals provided to the converters in the operational wind turbines is reduced to 1.7 KHz, and an estimated power loss is 16.7 KW, which is smaller than the power loss generated by operating the converters with normal frequency switching signals. By comparing FIG. 8 and FIG. 9, it can be seen that the switching loss including turn-on loss and turn-off loss is reduced when the frequency of the switching signals is changed from 3.4 KHz to 1.7 KHz.

Referring back to FIG. 7, after block 3012, the process of the method 3000 may return to block 3002 for further determining the number of the wind turbines in operation. Then, the frequency of the switching signals can be changed online according to the newly determined number of operational wind turbines.

Figure 10:
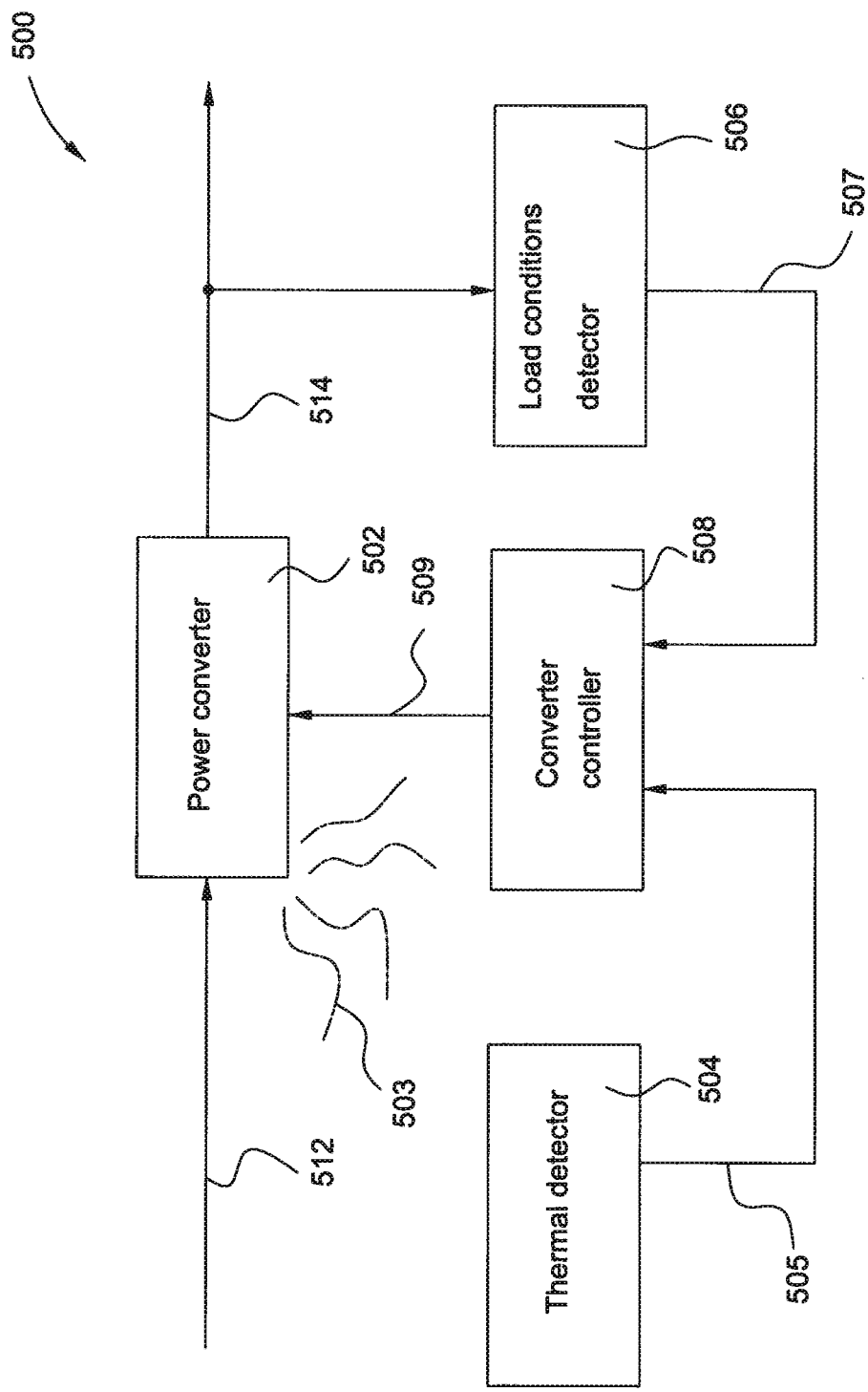
FIG. 10 is a block diagram of a power system in accordance with an exemplary embodiment.
Figure 11:
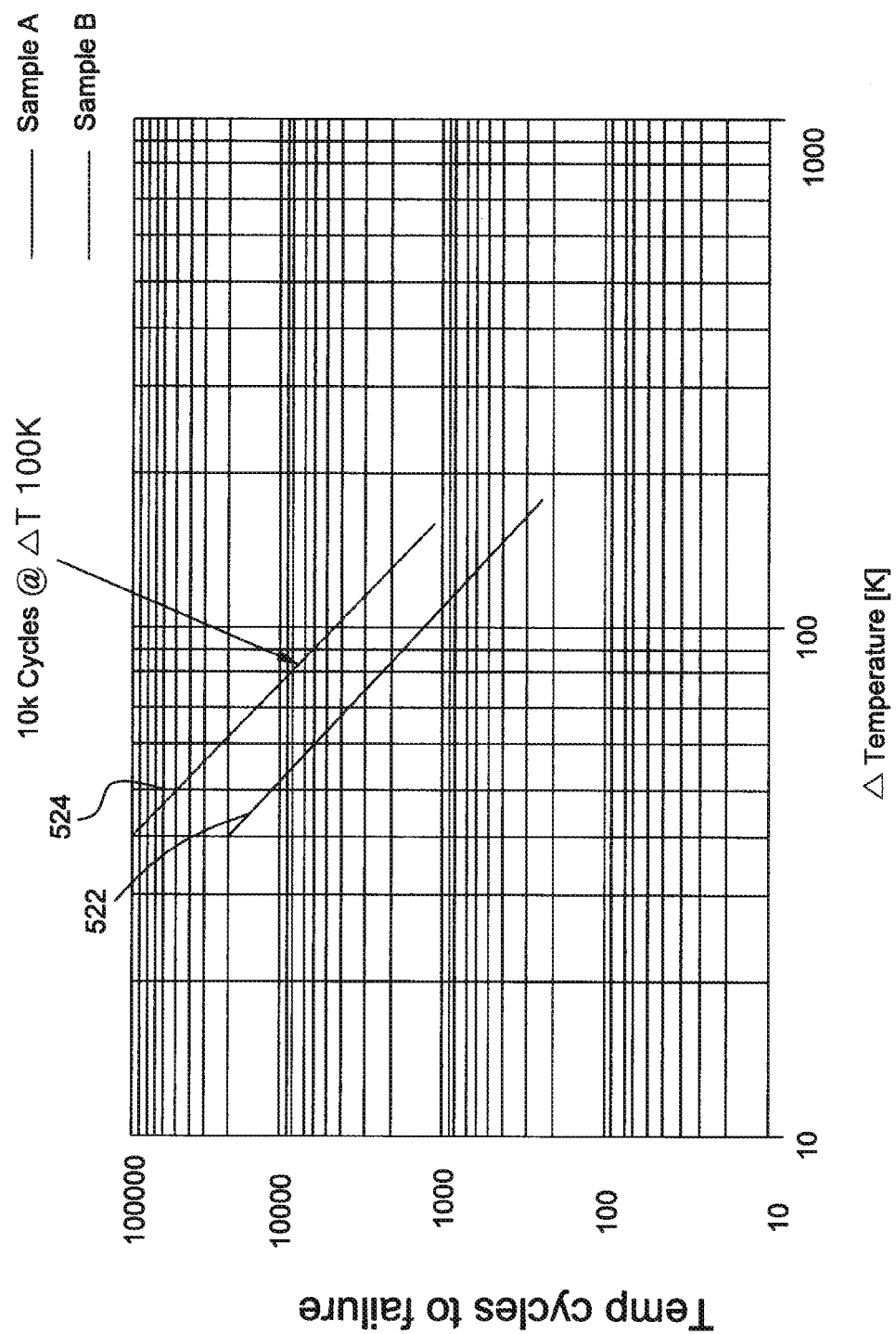
FIG. 11 illustrates test curves showing temperature cycling of switching elements used in power converter.
Figure 12:
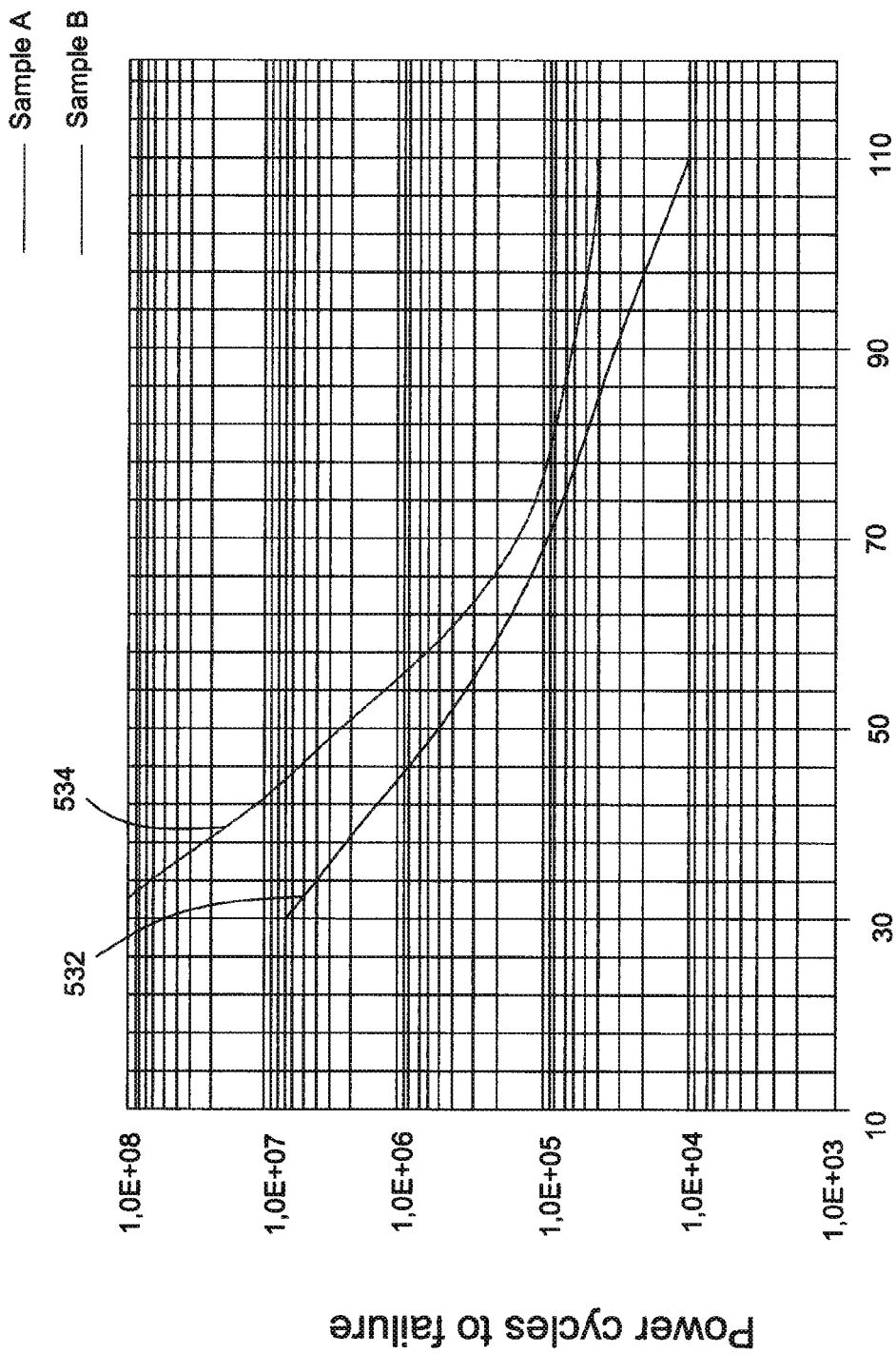
FIG. 12 illustrates test curves showing power cycling of switching elements used in power converter.

Referring to FIG. 10, another system 500 in accordance with an exemplary embodiment is illustrated. The system 500 may be a power consuming system or a power generating system. The term "power consuming system" and "power generating system" are defined above in describing the system 100 in association with FIG. 1. The system 500 is configured to implement frequency control over one or more converters used in the system 500 in view of variable thermal conditions, variable load condition, or a combination of variable thermal conditions and load conditions. In general, the converter or semiconductor based switching elements in the converter has a nominal lifetime or a nominal wear-out rate under a particular temperature and a particular load condition. When the power converter experiences variable temperatures conditions and variable load conditions, the wear-out rate of converter is changed accordingly, which may reduce the lifetime of the power converter. Referring to FIG. 11, two test curves 522 and 524 are plotted to show that greater ambient temperature variation causes the switching elements to have less number of temperature cycles to failure, and at the same ambient temperature variation, sample A can have a higher number of temperature cycles to failure than sample B. Referring to FIG. 12, another two test curves 532 and 534 are plotted to show that greater junction temperature variation also causes the switching elements to have less power cycles to failure, and at the same junction temperature variation, sample A can have a higher number of power cycles to failure than sample B.

Further referring to FIG. 10, in one implementation, the system 500 includes a power converter 502, a thermal detector 504, a load condition detector 506, and a converter controller 508. The power converter 502 is configured to convert a first form of electrical power 512 to a second form of electrical power 514 in accordance with switching signals 509 provided from the converter controller 508. The thermal detector 504 is in thermal communication (as indicated by dash lines 503) with the power converter 502 and is electrically coupled to the converter controller 508. The thermal detector 504 may use contact type thermal transducers or contactless temperature transducers. The thermal detector 504 converters detected temperature into first electrical signals 505 which is transmitted to the converter controller 508. The load condition detector 506 may include a voltage detector or current detector that is configured to detect voltage or current parameters in association with a load that is supplied with the electric power 514 converted from the power converter 502. The detected load conditions are transmitted in form of second electrical signals 507 to the converter controller 508.

Further referring to FIG. 10, in one implementation, the converter controller 508 obtains an actual wear-out rate based on the first electrical signals 505 representing thermal conditions and the second electrical signals 507 representing load conditions. In one implementation, a lookup table stored in a memory device associated with the converter controller 508 may be used to find the actual wear-out rate. In another implementation, an empirical equation may be used to calculate actual wear-out rate. The converter controller 508 is further configured to compare the obtained wear-out rate either by using lookup table or empirical equation with a desired wear-out rate in association with the power converter 502. The frequency of the switching signals 509 is adjusted based on the comparison result. If the obtained wear-out rate is determined to be greater than the desired wear-out rate, the frequency of the switching signals provided from the converter controller 508 is reduced. The frequency value of the switching signals after reduced should not be smaller than a lower limit, which may be set to satisfy bandwidth requirement. If the obtained wear-out rate is determined to be smaller than the desired wear-out rate, the frequency of the switching signals provided from the converter controller 508 is increased. The frequency value of the switching signals after increased should not be greater than an upper limit, which may be set to satisfy thermal dissipating requirement or harmonics requirement. Understandably, a maximum lifetime of the power converter could be obtained by dynamically adjusting the switching frequency for operating the power converter in view of variable temperature conditions or variable load conditions. One benefit of obtaining a maximum lifetime can make the system 500 have a long term reliability. The long term reliability is especially important in systems such as offshore wind turbines, where replacement of the failure power converter is complex and expensive.

Figure 13:
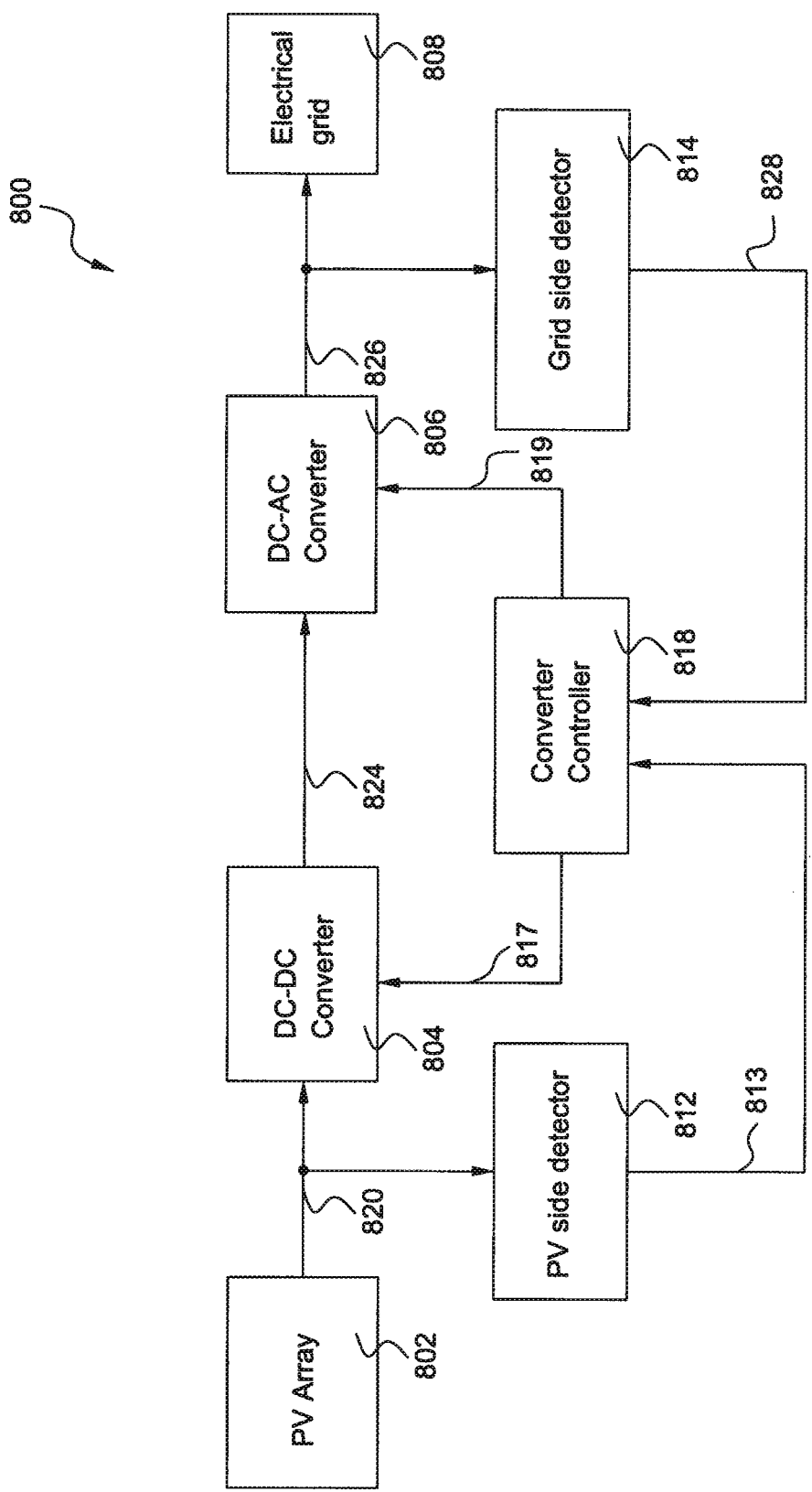
FIG. 13 is a block diagram of a solar power generation system in accordance with an exemplary embodiment.

Referring to FIG. 13, a solar power generation system 800 is illustrated in accordance with an exemplary embodiment. The solar power generation system 800 is also configured with the capability to control frequency of switching signals for operating one or more converters.

In one implementation, the solar power generation system 800 includes a photovoltaic (PV) array 802, a DC-DC converter 804, a DC-AC converter 806, a PV side detector 812, a grid side detector 814, and a converter controller 818. The PV array 802 converts solar energy from the sun to DC electric power 820. The DC-DC converter 804 boosts the voltage of the DC electric power 820 in accordance with switching signals 817 provided from the converter controller 818 to generate boosted DC electric power 824. The DC-AC converter 806 converts the DC electric power 824 to AC electric power 826 in accordance with switching signals 819 provided from the converter controller 818. The AC electric power 826 is supplied to the electric grid 808 for further transmission.

Further referring to FIG. 13, the PV side detector 812 is coupled between the PV array 802 and the DC-DC converter 804. The PV side detector 812 is configured to detect one or more conditions or events associated with the PV side of the solar power generation system 800. The PV side events may comprise irradiance events. The PV side detector 812 provides detection results in the form of electrical signals 813 to the converter controller 818.

In one implementation, the grid-side detector 814 is electrically coupled to a joint connection between the DC-AC converter 806 and the electrical grid 808. The grid-side detector 814 is configured to detect one or more grid side conditions or events associated with the grid side of the solar system 800. The grid side conditions may comprise fault on the electrical grid 808 including low voltage ride through (LVRT) conditions and zero voltage ride through (ZVRT) conditions, for example. The grid-side detector 814 provides detection results in the form of electrical signals 828 to the converter controller 818. The electrical signals 828 may include voltage signals, current signals, and phase information, for example.

Further referring to FIG. 13, in one implementation, the converter controller 818 is configured to determine whether one or more of the PV side or grid side conditions are present by receiving and analyzing the electrical signals. When the one or more conditions are determined to be present on the PV array 802, the converter controller 342 changes the frequency of the switching signals 817 provided to the DC-DC converter 804 or the switching signals 819 provided to the DC-AC converter 806. In one implementation, the frequency of the switching signals 817 or 819 is reduced to have less power loss during operation of the switching elements. When the one or more conditions are determined to be absent, the converter controller 818 returns the frequency of the switching signals to normal.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. A system for power conversion, the system comprising:
a power converter comprising switching elements;
a detector configured to detect a parameter in association with the power conversion of the system and to provide electrical signals indicative of the parameter; and
a controller coupled to the power converter and the detector and configured to receive the electrical signals transmitted from the detector and to determine the presence or absence of a system condition, the controller being further configured to send corresponding commands to instruct the power converter to perform power conversion by operating the switching elements in accordance with switching signals at a different frequency in response to a detection of the system condition,
wherein the detector comprises a thermal detector coupled to the controller and configured to detect ambient temperature surrounding the power converter, and
wherein the controller is configured to determine the presence or absence of the system condition by calculating a wear-out rate of the power converter based at least in part on the detected ambient temperature and determining whether the calculated wear-out rate satisfies predetermined criteria.

2. The system of claim 1, wherein the detector is further configured to provide electrical signals indicating an absence of the system condition, and the controller is further configured to send commands to restore the power converter to perform power conversion by operating the switching elements in accordance with switching signals at a nominal frequency.

3. The system of claim 1, wherein, when the calculated wear-out rate is determined to be greater than a threshold value, the frequency of the switching signals is reduced to a value equal to or greater than a lower limit.

4. The system of claim, wherein, when the calculated wear-out rate is determined to be smaller than a threshold value, the frequency of the switching signals is increased to a value equal to or smaller than an upper limit.

5. The system of claim 1, wherein the detector further comprises a load conditions detector coupled to the controller, the load conditions detector is configured to detect load conditions of the power converter, wherein the controller is further configured to use the detected load conditions to calculate the wear-out rate.

6. The system of claim 1, wherein the power converter comprises a generator-side converter electrically coupled to a generator for converting alternating current (AC) electric power or direct current (DC) electric power generated by the generator to DC electric power; wherein the detector comprises a generator-side detector coupled to the controller and wherein the system condition comprises a generator-side transient event, the generator-side detector is configured to detect a parameter relating to the generator-side transient event and provide electrical signals indicative of the presence of the generator-side transient event, and the controller is further configured to send corresponding commands to instruct the generator-side converter to perform power conversion by operating the switching elements in accordance with switching signals at a different frequency in response to a detection of the generator-side transient event.

7. The system of claim 6, wherein the power converter further comprises a grid-side converter coupled to an electrical grid for converting the DC electric power to AC electric power; and further comprising a grid-side detector coupled to the controller and wherein another system condition comprises a grid-side transient event, the grid-side detector is configured to detect a parameter relating to the grid-side transient event and provide electrical signals indicative of the presence of the grid-side transient event, and the controller is further configured to send corresponding commands to instruct the grid-side converter to perform power conversion by operating the switching elements in accordance with switching signals at a different frequency in response to a detection of the grid-side transient event.

8. A method for operating a system, the method comprising:
converting, by operating switching elements in accordance with switching signals, electric power generated from a generator to electric power for delivery to an electrical grid;
detecting a condition associated with the system; and
varying the frequency of the switching signals in response to the detected system Condition,
wherein the system condition comprises a non-conforming wear-out rate and the method further comprising:
detecting an ambient temperature of a power converter of the power system;
calculating a wear-out rate of the power converter based at least in part on the detected ambient temperature; and
determining whether the calculated wear-out rate satisfies a predetermined criteria.

9. The method of claim 8, further comprising determining when the system condition has ended and, in response, restoring the frequency of the switching signals.

10. The method of claim 8, wherein the system condition comprises one or more generator-side transient events; and wherein varying the frequency of the switching signals comprises reducing the frequency of the switching signals.

11. The method of claim 8, further comprising:
wherein the system condition comprises one or more grid-side transient events; and
wherein varying the frequency of the switching signals comprises reducing the frequency of the switching signals.

* * * * *